United States Patent
Wong et al.

(10) Patent No.: US 10,461,653 B1
(45) Date of Patent: Oct. 29, 2019

(54) ACTIVE-CLAMP FLYBACK CIRCUIT AND CONTROL METHOD THEREOF

(71) Applicant: JOULWATT TECHNOLOGY (HANGZHOU) CO., LTD., Hangzhou (CN)

(72) Inventors: Pitleong Wong, Hangzhou (CN); Xunwei Zhou, Hangzhou (CN)

(73) Assignee: JOULWATT TECHNOLOGY (HANGZHOU) CO., LTD., Yuhang District, Hangzhou, Zhejiang (CN)

( * ) Notice: Subject to any disclaimer, the term of this patent is extended or adjusted under 35 U.S.C. 154(b) by 0 days.

(21) Appl. No.: 16/367,252

(22) Filed: Mar. 28, 2019

(30) Foreign Application Priority Data

Sep. 10, 2018 (CN) .......................... 2018 1 1053512

(51) Int. Cl.
*H02M 3/335* (2006.01)

(52) U.S. Cl.
CPC ..... *H02M 3/33592* (2013.01); *H02M 3/3353* (2013.01)

(58) Field of Classification Search
CPC ............ H02M 3/22; H02M 3/24; H02M 3/28; H02M 3/325; H02M 3/335; H02M 3/33507; H02M 3/33592; H02M 3/3353; H02M 3/33569; H02M 1/08
See application file for complete search history.

(56) References Cited

U.S. PATENT DOCUMENTS

| | | | |
|---|---|---|---|
| 10,199,949 B1* | 2/2019 | Wong | H02M 3/33569 |
| 2017/0070152 A1* | 3/2017 | Liu | H02M 3/33515 |
| 2018/0062529 A1* | 3/2018 | Song | H02M 3/33507 |
| 2018/0076725 A1* | 3/2018 | Xue | H02M 1/083 |
| 2018/0294734 A1* | 10/2018 | Song | H02M 3/33592 |
| 2019/0068072 A1* | 2/2019 | Wong | H02M 1/08 |
| 2019/0140550 A1* | 5/2019 | Song | H02M 3/33592 |

* cited by examiner

*Primary Examiner* — Adolf D Berhane
(74) *Attorney, Agent, or Firm* — Muncy, Geissler, Olds & Lowe, P.C.

(57) ABSTRACT

This invention provides an active-clamp flyback circuit and a control method thereof. A voltage at the common end of the main power switch tube and the primary-side winding in active-clamp flyback circuit is a node voltage. After the first switch tube is turned off, when the node voltage reaches an input voltage for the first time, start timing. If the node voltage drops to a low threshold before the timing reaches a first time, a turn-off moment of the first switch tube in a next circle is advanced; and if the node voltage is greater than the low threshold when the timing reaches the first time, the turn-off moment of the first switch in the next circle is delayed. This invention can realize zero voltage switching for different input voltages and output voltages, which reduces an energy loss in the circuit.

20 Claims, 3 Drawing Sheets

US 10,461,653 B1

ACTIVE-CLAMP FLYBACK CIRCUIT AND CONTROL METHOD THEREOF

CROSS REFERENCE TO THE RELATED APPLICATIONS

This application is based upon and claims priority to Chinese Patent Application No. 201811053512.9, filed on Sep. 10, 2018, the entire contents of which are incorporated herein by reference.

TECHNICAL FIELD

This invention relates to a technical field of power electronics and, more particularly, to an active-clamp flyback circuit and a control method thereof.

BACKGROUND

A flyback switch power supply is a kind of an isolated switch power supply, which is widely used in AC/DC and DC/DC conversion and provides insulation and isolation between an input stage and an output stage. The flyback switch power supply includes a main power switch tube, a transformer, and a secondary-side rectification tube, and the transformer includes a primary-side winding and a secondary-side winding. The main power switch tube is connected with the primary-side winding, and the secondary-side rectification tube is connected with the secondary-side winding. A primary-side control circuit controls a switching state of the main power switch tube, and the secondary-side rectification tube located at the secondary-side is turned on to freewheeling after the main power switch tube is turned off.

An active clamp topological structure is to connect a capacitor with a drain of the main power switch tube in the flyback switch power supply, a switch tube is connected between the drain of the main power switch tube and the capacitor, and the capacitor is connected with an input power supply. The main power switch tube is turned off after being turned on, at the moment when the drain is turned off, the instantaneous spike and high-order harmonic of a turn-off waveform are coupled with the power supply through the capacitor to achieve an objective of clamping a voltage across the drain of the main power switch tube, which reduces a turn-off loss of the main power switch tube, thereby reducing a power loss of the switch power supply.

FIG. 1 shows an active-clamp flyback circuit. When a system is working in a boundary conduction mode (BCM) or a discontinuous conduction mode (DCM), at the beginning of each switching period, a magnetizing current is close to zero. In the prior art, turn-on and turn-off of the switch tube MA are generally controlled by a manner as shown in FIG. 2. The switch tube MA is turned on at any time during the main power switch tube M0 is turned off, and the switch tube MA is not turned on during the main power switch tube M0 is turned on.

$L_M$ is a magnetizing inductor in the primary-side winding. In the prior art, a control way as shown in FIG. 2 is used to control the turn-off of the switch tube MA. As there is no precise control for the turn-off moment of the switch tube MA before the main power switch tube M0 is turned on, a voltage across a common end of the main power switch tube and the primary-side winding may be relatively high when M0 is turned on, resulting in a relatively high energy loss.

SUMMARY

In view of this, an objective of this invention is to provide an active-clamp flyback circuit which reduces the energy loss of the circuit by controlling the turn-off moment of the switch tube, and this active-clamp flyback circuit solves the technical problem of the relatively high energy loss existed in the prior art.

In order to achieve the above-mentioned objective, this invention provides an active-clamp flyback circuit including a main power switch tube, a transformer, and a secondary-side rectification tube, and the transformer includes a primary-side winding and a secondary-side winding. The main power switch tube is connected with the primary-side winding, and the secondary-side rectification tube is connected with the secondary-side winding. A primary-side control circuit controls a switching state of the main power switch tube, and the secondary-side rectification tube is turned on to freewheeling after the main power switch tube is turned off.

The active-clamp flyback circuit further includes a first capacitor and a first switch tube. One end of the first capacitor is connected with a high potential end of an input power supply, the other end of the first capacitor is connected with a first end of the first switch tube, and a second end of the first switch tube is connected with a common end of the main power switch tube and the primary-side winding.

A voltage at the common end of the main power switch tube and the primary-side winding is a node voltage. After the first switch tube is turned off, when the node voltage reaches an input voltage for the first time, start timing. If the node voltage drops to a low threshold before the timing reaches a first time, a turn-off moment of the first switch tube in a next circle is advanced; and if the node voltage is greater than the low threshold when the timing reaches the first time, the turn-off moment of the first switch in the next circle is delayed.

Optionally, when an integral of a voltage across the primary-side winding to a second time is close to an integral of the input voltage to a turn-on time of the main power switch, the first switch tube may be turned off; and the second time may be from a turn-off moment of the main power switch tube to the turn-off moment of the first switch tube.

Optionally, when a difference between an integral of a voltage across the primary-side winding to a second time and an integral of the input voltage to a turn-on time of the main power switch tube reaches a first threshold, the first switch tube may be turned off; and the first threshold may have an upper limit or/and a lower limit, and the second time may be from a turn-off moment of the main power switch tube to the turn-off moment of the first switch tube.

Optionally, wherein when an integral of a voltage across the primary-side winding to a second time is a certain proportion of an integral of the input voltage to a turn-on time of the main power switch, the first switch tube may be turned off; and the proportion may have an upper limit or/and a lower limit, and the second time may be from a turn-off moment of the main power switch tube to the turn-off moment of the first switch tube.

Optionally, the input voltage and the node voltage may be detected by an auxiliary winding.

Optionally, when the timing reaches the first time, the main power switch tube may be turned on.

Optionally, if the node voltage drops to the low threshold before the timing reaches the first time, the main power switch tube may be turned on when the node voltage reaches the low threshold. Otherwise, the main power switch tube may be turned on when the timing reaches the first time.

Optionally, the active-clamp flyback circuit may include a switch tube control circuit configured to control turn-off of the first switch tube, and the switch tube control circuit may include a timing circuit and a logic circuit;

the switch tube control circuit may sample the node voltage and the input voltage, and may compare the node voltage with the input voltage, a timing enabling signal may be outputted to the timing circuit when the node voltage reaches the input voltage, the timing circuit may start timing, and a first signal may be changed from a first state to a second state when the timing of the timing circuit reaches the first time;

comparing the node voltage with the low threshold, a second signal may be outputted to the logic circuit, and the second signal may be changed from a first state to a second state when the node voltage reaches the low threshold; and according to a sequence in which the first signal and the second signal are changed from the first state to the second state, the logic circuit may adjust the turn-off moment of the first switch tube in the next circle.

Optionally, if a moment when the second signal is changed from the first state to the second state is more than a second threshold ahead of a moment when the first signal is changed from the first state to the second state, the turn-off moment of the first switch tube in the next circle may be advanced; and if the second signal is still in the first state when the first signal is changed from the first state to the second state, the turn-off moment of the first switch tube in the next circle may be delayed.

This invention further provides a control method for an active-clamp flyback circuit, which based on the active-clamp flyback circuit. The active-clamp flyback circuit includes a main power switch tube, a transformer, and a secondary-side rectification tube, and the transformer includes a primary-side winding and a secondary-side winding. The main power switch tube is connected with the primary-side winding, and the secondary-side rectification tube is connected with the secondary-side winding. A primary-side control circuit controls a switching state of the main power switch tube, and the secondary-side rectification tube is turned on to freewheeling after the main power switch tube is turned off.

The active-clamp flyback circuit further includes a first capacitor and a first switch tube. One end of the first capacitor is connected with a high potential end of an input power supply, the other end of the first capacitor is connected with a first end of the first switch tube, and a second end of the first switch tube is connected with a common end of the main power switch tube and the primary-side winding.

A voltage at the common end of the main power switch tube and the primary-side winding is a node voltage. After the first switch tube is turned off, when the node voltage reaches an input voltage for the first time, start timing. If the node voltage drops to a low threshold before the timing reaches a first time, a turn-off moment of the first switch tube in a next circle is advanced; and if the node voltage is greater than the low threshold when the timing reaches the first time, the turn-off moment of the first switch in the next circle is delayed.

Optionally, when an integral of a voltage across the primary-side winding to a second time is close to an integral of the input voltage to a turn-on time of the main power switch, the first switch tube may be turned off; and the second time may be from a turn-off moment of the main power switch tube to the turn-off moment of the first switch tube.

Optionally, when a difference between an integral of a voltage across the primary-side winding to a second time and an integral of the input voltage to a turn-on time of the main power switch reaches a first threshold, the first switch tube may be turned off, and the first threshold may have an upper limit or/and a lower limit, and the second time may be from a turn-off moment of the main power switch tube to the turn-off moment of the first switch tube.

Optionally, wherein when an integral of a voltage across the primary-side winding to a second time is a certain proportion of an integral of the input voltage to a turn-on time of the main power switch, the first switch tube may be turned off, and the proportion may have an upper limit or/and a lower limit, and the second time may be from a turn-off moment of the main power switch tube to the turn-off moment of the first switch tube.

Optionally, the input voltage and the node voltage may be detected by an auxiliary winding.

Optionally, when the timing reaches the first time, the main power switch tube may be turned on.

Optionally, if the node voltage drops to the low threshold before the timing reaches the first time, the main power switch tube may be turned on when the node voltage reaches the low threshold. Otherwise, the main power switch tube may be turned on when the timing reaches the first time.

Compared with the prior art, the technical solution of this invention has the following advantages. In this invention, after the first switch tube is turned off, when the node voltage reaches the input voltage for the first time, start timing. If the node voltage is reduced to the low threshold before the timing reaches the first time, the turn-off moment of the first switch tube in the next circle is advanced; and if the node voltage is greater than the low threshold when the timing reaches the first time, the turn-off moment of the first switch in the next circle is delayed, such that the node voltage is the low threshold at the time that the timing reaches the first time or before the timing reaches the first time, and the main power switch tube is turned on when the timing reaches the first time or the node voltage is the low threshold. This invention can realize zero voltage switching (ZVS) for different input voltages and output voltages, which reduces energy loss in the circuit.

DETAILED DESCRIPTION OF THE EMBODIMENTS

The preferable embodiments of this invention are described in detail below in combination with the accompanying drawings. However, this invention is not limited to these embodiments. This invention covers any alternatives, modifications, equivalent methods, and equivalent solutions within the spirit and scope of this invention.

In order to make the public have a thorough understanding on this invention, specific details are described in the following preferable embodiments of this invention, while those skilled in the art will fully understand this invention without descriptions of these details.

This invention is described more specifically in a way of taking examples with reference to the accompanying drawings in the following paragraphs. It should be noted that all the accompanying drawings are in a simplified form and not in accurate proportions, which are merely for conveniently and clearly illustrating embodiments of this invention.

Figure 1:
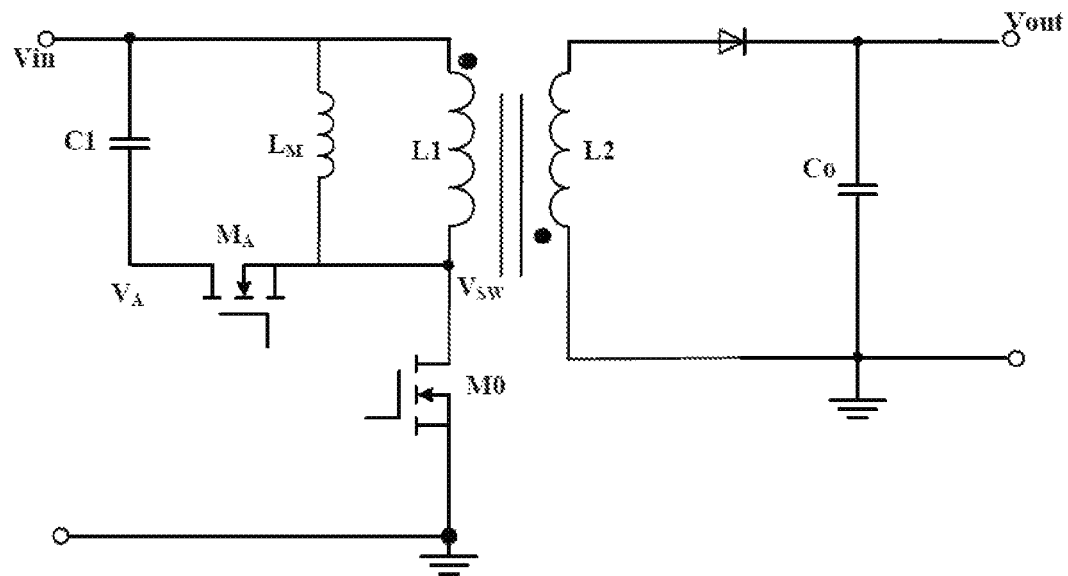
FIG. 1 is a schematic diagram of a circuit structure of an active-clamp flyback circuit in the prior art.
Figure 2:
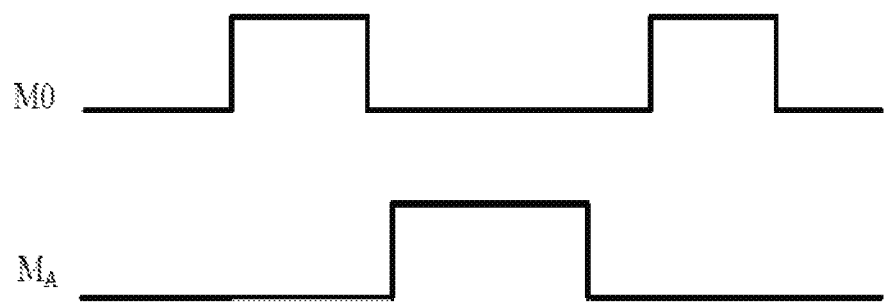
FIG. 2 is a schematic diagram of control waveforms of the active-clamp flyback circuit in the prior art.
Figure 3:
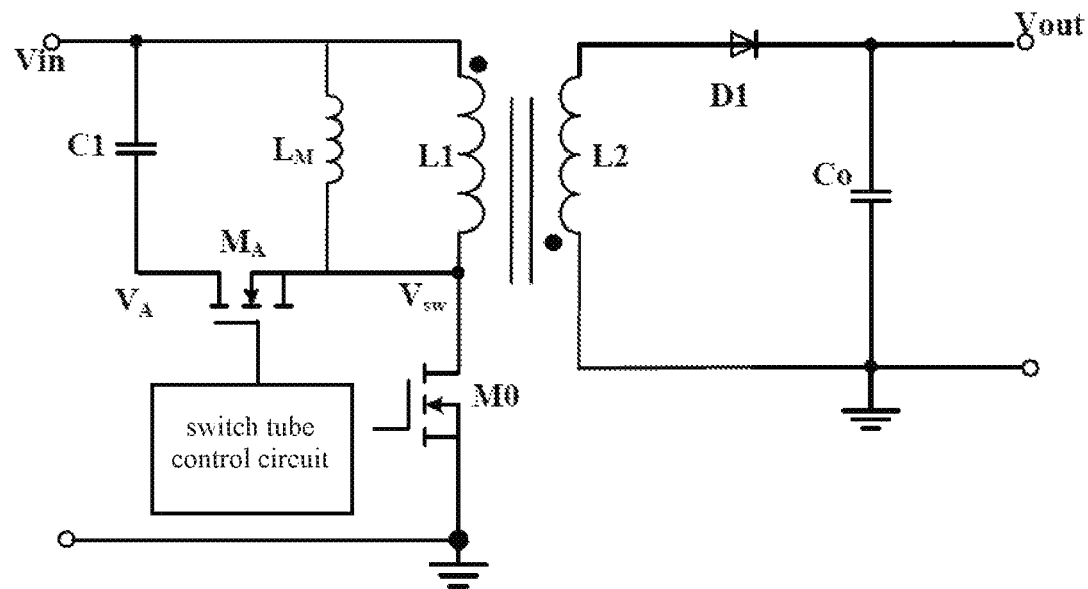
FIG. 3 is a schematic diagram of a circuit structure of an active-clamp flyback circuit according to this invention.

FIG. 3 shows a circuit structure of an active-clamp flyback circuit according to this invention, including a main power switch tube M0, a transformer, and a secondary-side rectification tube D1. The transformer includes a primary-side winding L1 and a secondary-side winding L2, and the primary-side winding L1 includes a magnetizing inductor $L_M$. The main power switch tube M0 is connected with the primary-side winding L1, and the secondary-side rectification tube D1 is connected with the secondary-side winding L2. A primary-side control circuit controls a switching state of the main power switch tube M0, and the secondary-side rectification tube D1 is turned on to freewheeling after the main power switch tube M0 is turned off.

The active-clamp flyback circuit further includes a first capacitor C1 and a first switch tube $M_A$. One end of the first capacitor C1 is connected with a high potential end of an input power supply, the other end of the first capacitor C1 is connected with a first end of the first switch tube $M_A$, and a second end of the first switch tube $M_A$ is connected with a common end of the main power switch tube M0 and the primary-side winding L1.

The active-clamp flyback circuit includes a switch tube control circuit configured to control turn-off of the first switch tube $M_A$. A voltage at the common end of the main power switch tube M0 and the primary-side winding L1 is a node voltage Vsw. After the first switch tube $M_A$ is turned off, when the node voltage Vsw reaches an input voltage Vin for the first time, start timing. If the node voltage Vsw drops to a low threshold before the timing reaches a first time T1, a turn-off moment of the first switch tube $M_A$ in a next circle is advanced; and if node voltage Vsw is greater than the low threshold when the timing reaches the first time T1, the turn-off moment of the first switch $M_A$ in the next circle is delayed. The low threshold described in this invention may be zero or a value close to zero.

Figure 4:
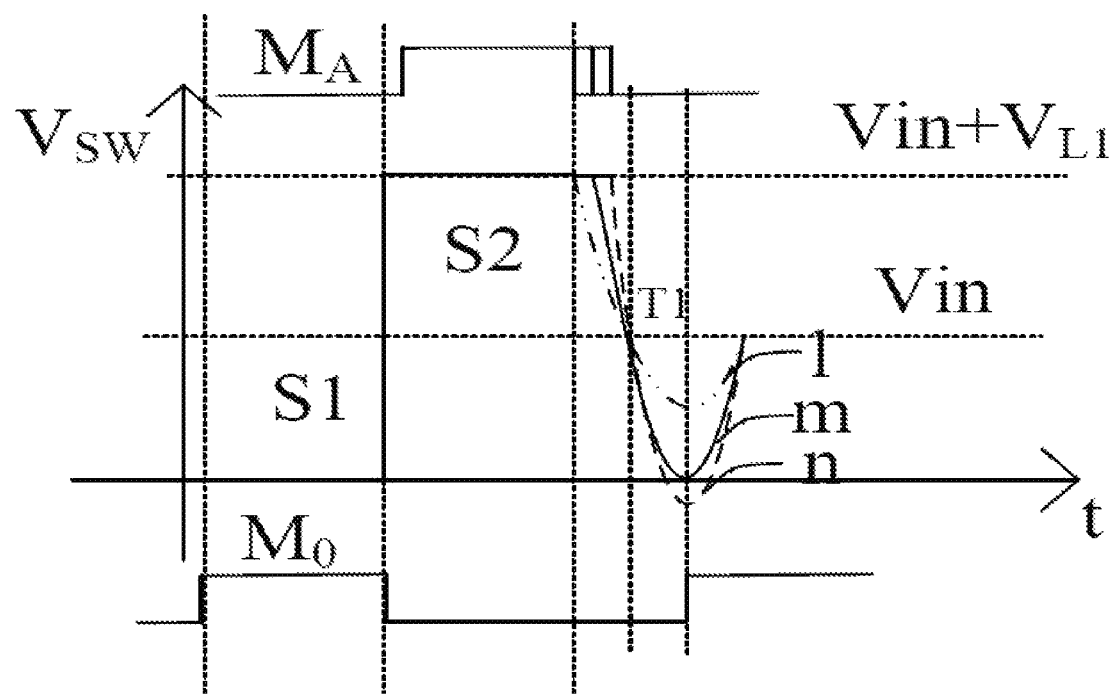
FIG. 4 is a schematic diagram of waveforms of the active-clamp flyback circuit according to this invention.

FIG. 4 shows working waveforms of the active-clamp flyback circuit according to this invention and gives turn-on waveforms and turn-off waveforms corresponding to the first switch tube $M_A$ and the main power switch tube M0. Vsw is the node voltage, the low threshold is zero, Vin is the input voltage, $V_{L1}$ is a voltage across the primary-side winding, S1 and S2 are areas of corresponding regions, respectively, and T1 represents the first time.

The turn-off moment of the first switch tube $M_A$ is realized by volt-second balance, and the volt-second balance is shown as S1=S2 in FIG. 4. Specifically, when an integral of the voltage $V_{L1}$ across the primary-side winding to a second time is close to an integral of the input voltage Vin to a turn-on time of the main power switch, the first switch tube is turned off; and the second time is a period of time from a turn-off moment of the main power switch tube to the turn-off moment of the first switch tube.

It can be seen from FIG. 4, by adjusting the turn-off moment of the first switch tube $M_A$, an ultimate objective of this invention is to realize the working waveform as a curve m. That is, after the first switch tube $M_A$ is turned off, when the node voltage Vsw reaches the input voltage for the first time, start timing. When the timing reaches the first time T1, the node voltage Vsw is the low threshold.

If before the timing reaches the first time T1, the node voltage Vsw drops to the low threshold, shown as a curve n in FIG. 4, it indicates that a negative current flowing through $L_M$ is too large, and the negative current should be decreased. Therefore, the turn-off moment of the first switch tube $M_A$ is advanced in the next circle.

If when the timing reaches the first time T1, the node voltage Vsw is still greater than the low threshold, shown as a curve 1 in FIG. 4, it indicates that the negative current flowing through $L_M$ is too small, and the negative current should be increased. Therefore, the turn-off moment of the first switch tube $M_A$ is delayed in the next circle.

In practice, when the turn-off moment of the first switch tube is adjusted, it is generally not necessary that S1 are completely equal to S2, and a certain threshold can be left. This invention gives two cases in which S1 are not equal to S2. However, this invention is not limited thereto. The two cases are respectively as follows.

1. When a difference between the integral of the voltage across the primary-side winding to the second time and the integral of the input voltage to the turn-on time of the main power switch reaches a first threshold, the first switch tube is turned off; and the first threshold has an upper limit or/and a lower limit, and the second time is a period of time from the turn-off moment of the main power switch tube to the turn-off moment of the first switch tube.

2. When the integral of the voltage across the primary-side winding to the second time is a certain proportion of the integral of the input voltage to the turn-on time of the main power switch, the first switch tube is turned off; and the proportion has an upper limit or/and a lower limit, and the second time is a period of time from the turn-off moment of the main power switch tube to the turn-off moment of the first switch tube.

There are also two ways to turn on the main power switch tube, which are respectively as follows.

1. If before the timing reaches the first time T1, the node voltage Vsw drops to the low threshold, and the area difference of the volt-second balance is within the threshold, the main power switch tube is turned on when the node voltage reaches the low threshold. Otherwise, the main power switch tube is turned on when the timing reaches the first time.

2. The main power switch tube is turned on when the timing reaches the first time.

It can ensure that when the main power switch tube is turned on, energy loss in the circuit is minimized, and zero voltage switching (ZVS) can be realized.

The first time T1 refers to the time that the node voltage drops from the input voltage Vin to a minimum value, and the first time T1 is not related to external changes of the circuit such as the input voltage Vin and an output voltage Vout and is determined only by LC inside the circuit. However, in practice, time approximately equal to T1 is calculated for timing.

In addition, the input voltage and the node voltage can be detected by an auxiliary winding besides direct detection. Since the node voltage is generally relatively high, the auxiliary winding is added to the primary-side winding, and the auxiliary winding can be used to detect corresponding signals representing the node voltage and the input voltage.

Figure 5:
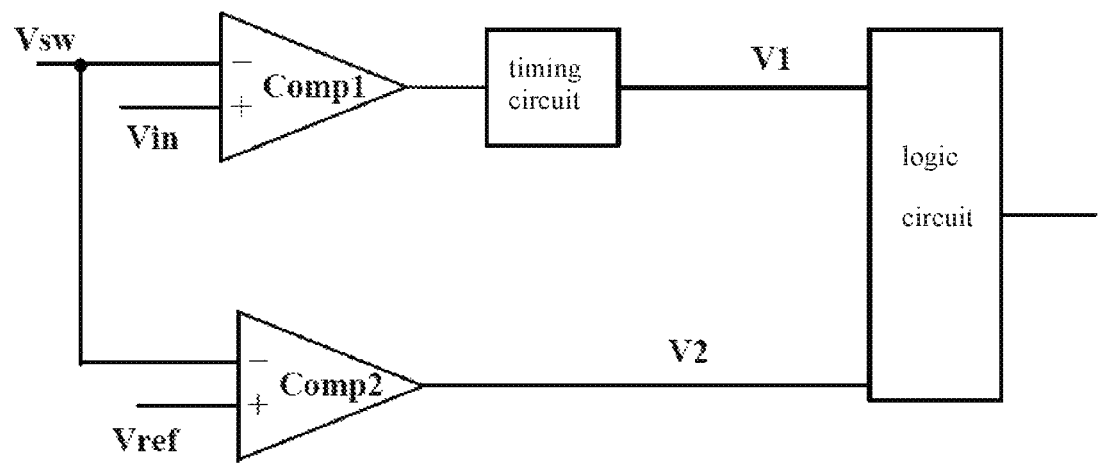
FIG. 5 is a schematic diagram of one embodiment of a switch tube control circuit.

According to the above-mentioned principle, FIG. 5 gives an embodiment of the switch tube control circuit. The switch tube control circuit includes a timing circuit, a logic circuit, and two comparators. Two input ends of the comparator comp1 sample the node voltage Vsw and the input voltage Vin, respectively, an output end of the comparator comp1 is connected with an enabling end of the timing circuit, and an output end of the timing circuit is connected with an input end of the logic circuit; and a first input end of the comparator comp2 receives the node voltage Vsw, a second input end of the comparator comp2 receives the low threshold Vref, an output end of the comparator comp2 is connected with the input end of the logic circuit, and an output end of the logic circuit is connected with a control end of the first switch tube $M_A$ to control the turn-off moment of the first switch tube $M_A$.

Comparing the node voltage Vsw with the input voltage Vin, when the node voltage Vsw reaches the input voltage Vin, a timing enabling signal is outputted to the timing circuit, and the timing circuit starts timing;

a first signal V1 is changed from a first state to a second state when the timing of the timing circuit reaches the first time T1;

comparing the node voltage Vsw with the low threshold Vref, a second signal V2 is outputted to the logic circuit, and the second signal V2 is changed from a first state to a second state when the node voltage Vsw reaches the low threshold Vref; and according to a sequence in which the first signal V1 and the second signal V2 are changed from the first state to the second state, the logic circuit regulates the turn-off moment of the first switch tube $M_A$ in the next circle.

The first states and the second states are respectively a high level and a low level or are respectively a low level and a high level, which are merely for explaining the changing of the state of the first signal V1 or the state of the second signal V2. The first state of the first signal V1 and the first state of the second signal V2 may be the same or different, and this invention is not limited thereto.

An ultimate objective of the adjustment of this invention is that the first signal V1 and the second signal V2 are simultaneously changed from the first state to the second state. In practice, due to the detection or the like, a certain time threshold is left. That is, the moment when the second signal V2 is changed from the first state to the second state is a second threshold ahead of the moment when the first signal V1 is changed from the first state to the second state, and the second threshold is zero or a value close to zero;

Therefore, if the moment when the second signal V2 is changed from the first state to the second state is more than the second threshold ahead of the moment when the first signal V1 is changed from the first state to the second state, it is considered that the node voltage Vsw drops to the low threshold before the timing reaches the first time T1, and the turn-off moment of the first switch tube $M_A$ in the next circle is advanced; and if the second signal V2 is still in the first state when the first signal V1 is changed from the first state to the second state, it is considered that the node voltage Vsw is greater than the low threshold when the timing reaches the first time T1, and the turn-off moment of the first switch tube $M_A$ in the next circle is delayed.

In FIG. 5, the output end of the logic circuit is connected with the control end of the first switch tube $M_A$ only for convenience of illustration. In practice, the two are not necessarily directly connected with each other, and there may be a drive circuit or the like between them, which is explained herein.

In addition, FIG. 5 only gives one embodiment, and this invention is not limited thereto.

Although embodiments are separately described and illustrated in the foregoing, while with respect to partial common technology, from the view of those skilled in the art, it is possible to replace and integrate embodiments. Another recorded embodiment can be used for reference referring to the content that is not explicitly described in one embodiment.

The above-mentioned implement ways are not intended to limit the protection scope of this technical solution. Any modifications, equivalent substitutions, and improvements within the spirit and principle of the above-mentioned implement ways should be included in the protection scope of this technical solution.

What is claimed is:

1. An active-clamp flyback circuit, comprising a main power switch tube, a transformer, and a secondary-side rectification tube,
   the transformer comprising a primary-side winding and a secondary-side winding, wherein the main power switch tube is connected with the primary-side winding, the secondary-side rectification tube is connected with the secondary-side winding,
   a primary-side control circuit controls a switching state of the main power switch tube, and the secondary-side rectification tube is turned on to freewheeling after the main power switch tube is turned off;
   wherein the active-clamp flyback circuit further comprises a first capacitor and a first switch tube, one end of the first capacitor is connected with a high potential end of an input power supply, the other end of the first capacitor is connected with a first end of the first switch tube, and a second end of the first switch tube is connected with a common end of the main power switch tube and the primary-side winding; and
   wherein a voltage at the common end of the main power switch tube and the primary-side winding is a node voltage, after the first switch tube is turned off, when the node voltage reaches an input voltage for the first time, start timing, if the node voltage drops to a low threshold before the timing reaches a first time, a turn-off moment of the first switch tube in a next circle is advanced; and if the node voltage is greater than the low threshold when the timing reaches the first time, the turn-off moment of the first switch tube in the next circle is delayed.

2. The active-clamp flyback circuit according to claim 1, wherein when an integral of a voltage across the primary-side winding to a second time is close to an integral of the input voltage to a turn-on time of the main power switch, the first switch tube is turned off; and the second time is a period of time from a turn-off moment of the main power switch tube to the turn-off moment of the first switch tube.

3. The active-clamp flyback circuit according to claim 1, wherein when a difference between an integral of a voltage across the primary-side winding to a second time and an integral of the input voltage to a turn-on time of the main power switch reaches a first threshold, the first switch tube is turned off; and the first threshold has an upper limit or/and a lower limit, and the second time is a period of time from a turn-off moment of the main power switch tube to the turn-off moment of the first switch tube.

4. The active-clamp flyback circuit according to claim 1, wherein when an integral of a voltage across the primary-side winding to a second time is a certain proportion of an integral of the input voltage to a turn-on time of the main power switch, the first switch tube is turned off; and the proportion has an upper limit or/and a lower limit, and the second time is a period of time from a turn-off moment of the main power switch tube to the turn-off moment of the first switch tube.

5. The active-clamp flyback circuit according to claim 1, wherein the input voltage and the node voltage are detected by an auxiliary winding.

6. The active-clamp flyback circuit according to claim 2, wherein when the timing reaches the first time, the main power switch tube is turned on.

7. The active-clamp flyback circuit according to claim 2, wherein if the node voltage drops to the low threshold before the timing reaches the first time, the main power switch tube is turned on when the node voltage reaches the low threshold, otherwise, the main power switch tube is turned on when the timing reaches the first time.

8. The active-clamp flyback circuit according to claim 1, wherein the active-clamp flyback circuit comprises a switch tube control circuit configured to control turn-off of the first switch tube, and the switch tube control circuit comprises a timing circuit and a logic circuit;
the switch tube control circuit samples the node voltage and the input voltage, and compares the node voltage with the input voltage, a timing enabling signal is outputted to the timing circuit when the node voltage reaches the input voltage, the timing circuit starts timing, and a first signal is changed from a first state to a second state when the timing of the timing circuit reaches the first time;
comparing the node voltage with the low threshold, a second signal is outputted to the logic circuit, and the second signal is changed from a first state to a second state when the node voltage reaches the low threshold; and
according to a sequence in which the first signal and the second signal are changed from the first state to the second state, the logic circuit regulates the turn-off moment of the first switch tube in the next circle.

9. The active-clamp flyback circuit according to claim 8, wherein if a moment when the second signal is changed from the first state to the second state is more than a second threshold ahead of a moment when the first signal is changed from the first state to the second state, the turn-off moment of the first switch tube in the next circle is advanced; and
if the second signal is still in the first state when the first signal is changed from the first state to the second state, the turn-off moment of the first switch tube in the next circle is delayed.

10. A control method for an active-clamp flyback circuit, based on the active-clamp flyback circuit, wherein the active-clamp flyback circuit comprises a main power switch tube, a transformer, and a secondary-side rectification tube, the transformer comprises a primary-side winding and a secondary-side winding, the main power switch tube is connected with the primary-side winding, the secondary-side rectification tube is connected with the secondary-side winding, a primary-side control circuit controls a switching state of the main power switch tube, and the secondary-side rectification tube is turned on to freewheeling after the main power switch tube is turned off;
the active-clamp flyback circuit further comprises a first capacitor and a first switch tube, one end of the first capacitor is connected with a high potential end of an input power supply, the other end of the first capacitor is connected with a first end of the first switch tube, and a second end of the first switch tube is connected with a common end of the main power switch tube and the primary-side winding; and
a voltage at the common end of the main power switch tube and the primary-side winding is a node voltage, after the first switch tube is turned off, when the node voltage reaches an input voltage for the first time, start timing, if the node voltage drops to a low threshold before the timing reaches a first time, a turn-off moment of the first switch tube in a next circle is advanced; and if the node voltage is greater than the low threshold when the timing reaches the first time, the turn-off moment of the first switch in the next circle is delayed.

11. The control method for the active-clamp flyback circuit according to claim 10, wherein when an integral of a voltage across the primary-side winding to a second time is close to an integral of the input voltage to a turn-on time of the main power switch, the first switch tube is turned off and the second time is a period of time from a turn-off moment of the main power switch tube to the turn-off moment of the first switch tube.

12. The control method for the active-clamp flyback circuit according to claim 10, wherein when a difference between an integral of a voltage across the primary-side winding to a second time and an integral of the input voltage to a turn-on time of the main power switch reaches a first threshold, the first switch tube is turned off; and the first threshold has an upper limit or/and a lower limit, and the second time is a period of time from a turn-off moment of the main power switch tube to the turn-off moment of the first switch tube.

13. The control method for the active-clamp flyback circuit according to claim 10, wherein when an integral of a voltage across the primary-side winding to a second time is a certain proportion of an integral of the input voltage to a turn-on time of the main power switch, the first switch tube is turned off; and the proportion has an upper limit or/and a lower limit, and the second time is a period of time from a turn-off moment of the main power switch tube to the turn-off moment of the first switch tube.

14. The control method for the active-clamp flyback circuit according to claim 10, wherein the input voltage and the node voltage are detected by an auxiliary winding.

15. The control method for the active-clamp flyback circuit according to claim 11, wherein when the timing reaches the first time, the main power switch tube is turned on.

16. The control method for the active-clamp flyback circuit according to claim 11, wherein if the node voltage drops to the low threshold before the timing reaches the first time, the main power switch tube is turned on when the node voltage reaches the low threshold, otherwise, the main power switch tube is turned on when the timing reaches the first time.

17. The active-clamp flyback circuit according to claim 3, wherein when the timing reaches the first time, the main power switch tube is turned on.

18. The active-clamp flyback circuit according to claim 4, wherein when the timing reaches the first time, the main power switch tube is turned on.

19. The active-clamp flyback circuit according to claim 3, wherein if the node voltage drops to the low threshold before the timing reaches the first time, the main power switch tube is turned on when the node voltage reaches the low threshold, otherwise, the main power switch tube is turned on when the timing reaches the first time.

20. The active-clamp flyback circuit according to claim 4, wherein if the node voltage drops to the low threshold before the timing reaches the first time, the main power switch tube is turned on when the node voltage reaches the low threshold, otherwise, the main power switch tube is turned on when the timing reaches the first time.

* * * * *